Patented Aug. 4, 1953

2,647,931

UNITED STATES PATENT OFFICE 2,647,931

ALKYLATION OF PHENOLIC COMPOUNDS

Richard C. Wackher, La Grange, and Carl B. Linn, Riverside, Ill., assignors to Universal Oil Products Company, Chicago, Ill., a corporation of Delaware No Drawing. Application June 29, 1949, Serial No. 102,165

15 Claims. (Cl. 260—613)

This application is a continuation-in-part of our copending application Serial No. 625,949, filed October 31, 1945, now U. S. Patent No. 2,488,752.

This invention relates to the catalytic interaction of a phenolic compound with a compound capable of yielding a hydrocarbon radical. It is more particularly concerned with the production of alkyl phenols by reacting a phenol containing a hydrogen atom attached to the ring with an alkylating agent in the presence of a catalyst comprising a solid oxygen-containing complex formed by heating oxygen, boron trifluoride, and a hydrocarbon at a temperature above about 150° C.

The alkylation of phenols to produce mono and polyalkyl phenols is an important reaction in organic synthesis since the alkyl phenols not only possess utility as such but also because they are important intermediates in the preparation of inhibitors and the like. We have discovered that the alkylation of phenols may be accomplished with ease and efficiency if a particular type of catalyst is utilized.

In one embodiment our invention relates to a process which comprises reacting a phenolic compound containing a substitutable hydrogen atom attached to the ring with a compound capable of yielding a hydrocarbon radical at condensation conditions in the presence of a catalyst comprising a solid oxygen-containing complex formed by heating oxygen, boron trifluoride, and a hydrocarbon at a temperature above about 150° C.

In a more specific embodiment our invention relates to a process which comprises reacting a phenolic compound containing a substitutable hydrogen atom attached to the ring with a monoolefin at alkylating conditions in the presence of a catalyst comprising a solid oxygen-containing complex formed by heating oxygen, boron trifluoride, and a hydrocarbon at a temperature above about 150° C.

Phenolic compounds that may be reacted with alkylating agents in accordance with the process of this invention must contain at least one substitutable nuclear hydrogen atom, i. e., a hydrogen atom that is attached to the ring and that is capable of being replaced by a hydrocarbon radical, particularly an alkyl group. Examples of such compounds are phenol; cresol; polyhydric phenols such as hydroquinone and catechol; alkoxyphenols such as guiacol, paramethoxyphenol, and paraethoxyphenol, in which the number of carbon atoms in the alkyl group is small; naphthol, and the like.

Alkylating agents capable of yielding an alkyl group under the conditions of operation employed in the process are one type of compound capable of yielding hydrocarbon radicals that are utilizable in our process. Compounds of this type include both normally gaseous and normally liquid olefins, particularly olefins containing more than two carbon atoms per molecule. Such olefins include propylene, iso and normal butylenes, iso and normal amylenes, methyl-cyclohexene, and the like. Other alkylating agents include cycloparaffins containing three or four carbon atoms in the ring, mercaptans, mineral acid esters such as alkyl halides, and alkoxy compounds of the class consisting of aliphatic alcohols, and esters of carboxylic acids. In general the alkylating agents that are most easily reacted in our process comprises those in which the double bond or in which the substituent, such as the chlorine atom in alkyl chlorides, is attached to a tertiary carbon atom. Other compounds capable of yielding a hydrocarbon radical include diolefins and aromatic compounds in which a nuclear hydrogen atom has been replaced by an olefinic hydrocarbon radical. Examples of such aromatic compounds are styrene, alpha methyl styrene, and the like.

We have found that catalysts useful in promoting the condensation of phenolic compounds containing a substitutable hydrogen atom attached to the ring with compounds capable of yielding hydrocarbon radicals may be made by interacting oxygen, or an oxygen-containing gas, with boron trifluoride and a hydrocarbon to form a brown, pasty, oxygen-containing hydrocarbon complex of boron trifluoride. A simple method of conducting this preparation is to charge a liquid hydrocarbon such as normal pentane to an autoclave, pressure the autoclave with air and boron trifluoride and heat the mixture until reaction takes place. The temperature at which reaction takes place is indicated by a substantial drop in pressure. This temperature usually is higher than 150° C. After the heating has been conducted for a suitable length of time, generally a few hours, the autoclave is cooled, the pressure is released, and the catalyst is recovered. Since there are a number of different hydrocarbons, such as iso and normal paraffins, olefins, and the like, which can be used, it is apparent that there are a number of alternative catalysts with somewhat different properties which can be prepared by our process. When aromatic hydrocarbons such as benzene are used, higher temperatures of the order of 350° C. must be used to bring about the reaction which produces the catalyst.

The process of our invention may be carried out in batch operation by placing a quantity of the catalyst in a reactor equipped with a stirring device, adding the phenolic compound, heating or cooling to the reaction temperature, slowly adding the alkylating agent while mixing the contents of the reactor, and recovering the product. However, the preferred method of operation is of the continuous type. In one mode of continuous operation, the catalyst, either alone or on supports or a carrier, may be placed in a reaction chamber and preheated mixtures of the phenolic compound and the alkylating agent passed through the catalyst bed. The products from such a treatment may be continuously fractionated to separate the unreacted substances from the desired products.

The reactions herein described usually are carried out at temperatures of from about —20° to about 400° C., preferably from 50° to 250° C., and under a pressure of from substantially atmospheric to approximately 100 atmospheres. It ordinarily is preferable to have present in the charging stock a molecular excess of the phenolic compound over the alkylating agent in order to minimize side reactions.

The following examples are given to illustrate the method of preparing the catalyst and the results obtained by the use of the present process, although the data presented are not introduced with the intention of unduly restricting the generally broad scope of the invention:

EXAMPLE I

A rotating autoclave was charged with 62 g. of normal pentane, 21 g. of boron trifluoride, and 1.43 mols of air. This charge had an initial pressure of 445 p. s. i. The autoclave was heated to 150° and while it was maintained at that temperature there was no decrease in pressure. After the autoclave was cooled to room temperature and opened, it was found that there was no solid material therein. The noncondensable gas evolved was found to contain 20% oxygen after being scrubbed with caustic solution. Apparently no oxygen had been reacted.

EXAMPLE II

A mixture consisting of 62 g. of normal pentane, 13 g. of boron trifluoride, and 0.75 mol of air, was heated in an autoclave to 200° C. and maintained at that temperature for 13 hours. During this time the pressure dropped from 800 p. s. i. to 730 p. s. i. After cooling to room temperature, the following recovery was made: 0.61 mol of noncondensable gas, which analyzed pure nitrogen; 54 g. of liquid material, which analyzed normal pentane; and a considerable amount of unweighed heavy brown solid residue.

A comparison of the results obtained in the experiments given under Example I and under Example II shows that a temperature exceeding 150° C. was required to effect the reaction between air, normal pentane, and boron trifluoride.

EXAMPLE III

*Apparatus.*—250 cc. three-necked flask with a drawoff equipped with a stopcock in the bottom, fitted with a 19 inch reflux condenser, a 90 cc. calibrated cylindrical dropping funnel and a mercury sealed stirrer. Also, a 22 inch and a 7 inch vacuum packed spiral wire-filled column and a 100 cc. Claissen flask.

*Procedure.*—To a vigorously stirred mixture of 46.80 grams (0.497 mol) of phenol, 12.96 grams of the catalyst prepared as described in Example II, and 15.73 grams of petroleum ether with a boiling point of 70–80° and containing mostly alkanes, maintained at 35° C., were added dropwise over a 15 minute period, a mixture consisting of 17.63 grams (0.247 mol) of isoamylenes and 7.76 grams of petroleum ether. There was a 6° C. temperature rise after only ½ of the unsaturates were in, but finally the reaction temperature fell to that of the bath. The reaction mixture was stirred an additional hour at approximately 35° C., after which the temperature was raised in 5 minutes to 70° C., and kept at 70–80° C. for another hour. The catalyst was separated from the reaction mixture and the phenols were separated from the other organic materials by solution in excess 30 per cent sodium hydroxide and by removal of the hydrocarbon layer, and were recovered by acidification of the aqueous layer with access concentrated hydrochloric acid. The crude phenols were extracted with ether, the extracts washed with water, sodium bicarbonate, and again with water, and thereafter dried over sodium sulfonate. The combined ether extracts were fractionated first at atmospheric pressure and finally at reduced pressure. The isoamyl phenol recovered amounted to 26.2 grams, which represents a yield of 63.5% of the theoretical, based on the isoamylene charged.

We claim as our invention:

1. A process which comprises reacting a phenolic compound containing a substitutable hydrogen atom attached to the ring with a compound capable of yielding a hydrocarbon radical at condensation conditions in the presence of a catalyst comprising a solid oxygen-containing complex formed by heating oxygen, boron trifluoride, and a hydrocarbon at a temperature above about 150° C.

2. A process which comprises reacting a phenolic compound containing a substitutable hydrogen atom attached to the ring with an alkylating agent at alkylating conditions in the presence of a catalyst comprising a solid oxygen-containing complex formed by heating oxygen, boron trifluoride, and a hydrocarbon at a temperature above about 150° C.

3. A process which comprises reacting a phenolic compound containing a substitutable hydrogen atom attached to the ring with an olefinic hydrocarbon at alkylating conditions in the presence of a catalyst comprising a solid oxygen-containing complex formed by heating oxygen, boron trifluoride, and a hydrocarbon at a temperature above about 150° C.

4. A process which comprises reacting a phenolic compound containing a substitutable hydrogen atom attached to the ring with a monoolefin at alkylating conditions in the presence of a catalyst comprising a solid oxygen-containing complex formed by heating oxygen, boron trifluoride, and a hydrocarbon at a temperature above about 150° C.

5. A process which comprises reacting a phenolic compound containing a substitutable hydrogen atom attached to the ring with a monoolefin containing more than two carbon atoms per molecule at alkylating conditions in the presence of a catalyst comprising a solid oxygen-containing complex formed by heating oxygen, boron trifluoride, and a hydrocarbon at a temperature above about 150° C.

6. A process which comprises reacting a phenolic compound containing a substitutable hydrogen atom attached to the ring with an isoolefin at alkylating conditions in the presence of a catalyst comprising a solid oxygen-containing complex formed by heating oxygen, boron trifluoride, and a hydrocarbon at a temperature above about 150° C.

7. A process which comprises reacting a phenolic compound containing a substitutable hydrogen atom attached to the ring with an isoamylene at alkylating conditions in the presence of a catalyst comprising a solid oxygen-containing complex formed by heating oxygen, boron trifluoride, and a hydrocarbon at a temperature above about 150° C.

8. A process which comprises reacting a phenolic compound containing a substitutable hydrogen atom attached to the ring with a mineral acid ester at alkylating conditions in the presence of a catalyst comprising a solid oxygen-containing complex formed by heating oxygen, boron trifluoride, and a hydrocarbon at a temperature above about 150° C.

9. A process which comprises reacting a phenolic compound containing a substitutable hydrogen atom attached to the ring with an alkyl halide at alkylating conditions in the presence of a catalyst comprising a solid oxygen-containing complex formed by heating oxygen, boron trifluoride, and a hydrocarbon at a temperature above about 150° C.

10. A process which comprises reacting a phenolic compound containing a substitutable hydrogen atom attached to the ring with an alkyl chloride at alkylating conditions in the presence of a catalyst comprising a solid oxygen-containing complex formed by heating oxygen, boron trifluoride, and a hydrocarbon at a temperature above about 150° C.

11. A process which comprises reacting a phenolic compound containing a substitutable hydrogen atom attached to the ring with a tertiary alkyl chloride at alkylating conditions in the presence of a catalyst comprising a solid oxygen-containing complex formed by heating oxygen, boron trifluoride, and a hydrocarbon at a temperature above about 150° C.

12. A process which comprises reacting a phenolic compound containing a substitutable hydrogen atom attached to the ring with tertiary butyl chloride at alkylating conditions in the presence of a catalyst comprising a solid oxygen-containing complex formed by heating oxygen, boron trifluoride, and a hydrocarbon at a temperature above about 150° C.

13. A process which comprises reacting a phenolic compound containing a substitutable hydrogen atom attached to the ring with an alkylating agent in the presence of a catalyst comprising a solid oxygen-containing complex formed by heating oxygen, boron trifluoride, and a paraffin at a temperature above about 150° C.

14. A process which comprises reacting a phenolic compound containing a substitutable hydrogen atom attached to the ring with an alkylating agent in the presence of a catalyst comprising a solid oxygen-containing complex formed by heating oxygen, boron trifluoride, and an olefin at a temperature above about 150° C.

15. A process which comprises reacting a phenolic compound containing a substitutable hydrogen atom attached to the ring with an alkylating agent in the presence of a catalyst comprising a solid oxygen-containing complex formed by heating oxygen, boron trifluoride, and an aromatic hydrocarbon at a temperature above about 350° C.

RICHARD C. WACKHER.
CARL B. LINN.

References Cited in the file of this patent

UNITED STATES PATENTS

| Number | Name | Date |
| --- | --- | --- |
| 2,275,312 | Tinker et al. | Mar. 3, 1942 |
| 2,403,013 | Meadow | July 2, 1946 |
| 2,488,752 | Wackher et al. | Nov. 22, 1949 |